(12) United States Patent
Michaud et al.

(10) Patent No.: US 6,718,176 B2
(45) Date of Patent: Apr. 6, 2004

(54) APPARATUS, AND ASSOCIATED METHOD, FOR DISPLAYING POSITIONAL DATA ASSOCIATED WITH MOBILE STATIONS OF A RADIO COMMUNICATION SYSTEM

(75) Inventors: Russ Michaud, Justin, TX (US); Heikki Wikstedt, Irving, TX (US)

(73) Assignee: Nokia Corporation, Espoo (FI)

( * ) Notice: Subject to any disclaimer, the term of this patent is extended or adjusted under 35 U.S.C. 154(b) by 42 days.

(21) Appl. No.: 09/797,092

(22) Filed: Mar. 1, 2001

(65) Prior Publication Data

US 2002/0123356 A1 Sep. 5, 2002

(51) Int. Cl.[7] .............................................. H04Q 7/20
(52) U.S. Cl. .................................... 455/457; 455/456.1
(58) Field of Search .................................. 455/404, 420, 455/422, 456, 457, 458, 459, 9, 12.1, 427, 518, 519; 342/357.1–357.13; 701/200, 208; 340/988, 989, 990, 991, 992, 993

(56) References Cited

U.S. PATENT DOCUMENTS

| | | | | |
|---|---|---|---|---|
| 5,389,934 A | * | 2/1995 | Kass ...................... 342/357.07 |
| 5,689,269 A | * | 11/1997 | Norris ..................... 342/357.08 |
| 5,731,979 A | * | 3/1998 | Yano et al. .................. 340/995 |
| 5,902,347 A | * | 5/1999 | Backman et al. ........... 701/200 |
| 5,903,228 A | * | 5/1999 | Ohgaki et al. .............. 340/988 |
| 6,151,505 A | * | 11/2000 | Larkins et al. .............. 455/456 |
| 6,167,277 A | * | 12/2000 | Kawamoto ................... 455/457 |
| 6,212,391 B1 | * | 4/2001 | Saleh et al. ................. 342/450 |
| 6,324,467 B1 | * | 11/2001 | Machii et al. ............. 701/200 |
| 6,359,571 B1 | * | 3/2002 | Endo et al. .................. 340/905 |
| 6,366,782 B1 | * | 4/2002 | Fumarolo et al. ........... 455/457 |
| 6,366,856 B1 | * | 4/2002 | Johnson ..................... 701/200 |
| 6,393,292 B1 | * | 5/2002 | Lin ............................. 455/435 |

FOREIGN PATENT DOCUMENTS

| | | | |
|---|---|---|---|
| JP | 4-86034 | * | 3/1992 |
| JP | 4-152724 | * | 5/1992 |

* cited by examiner

*Primary Examiner*—Jean Gelin (57) ABSTRACT

Apparatus, and an associated method, by which to display positional data related to one or more mobile stations operable in a cellular or other radio communication system. The positional data is displayed at a display device of the selected mobile station. The positional data is overlaid upon, or otherwise displayed together with, a map display of an area encompassing the location at which the mobile station is identified to be positioned. A user of the mobile station at which the positional data and map display are displayed is able to ascertain the position of the mobile station merely by viewing the display.

10 Claims, 4 Drawing Sheets

APPARATUS, AND ASSOCIATED METHOD, FOR DISPLAYING POSITIONAL DATA ASSOCIATED WITH MOBILE STATIONS OF A RADIO COMMUNICATION SYSTEM

The present invention relates generally to a manner by which to utilize positional data, generated during operation of a radio communication system, such as a cellular communication system, of the locations at which mobile stations operable in the communication system are positioned. More particularly, the present invention relates to apparatus, and associated method, by which to display the positional data related to one or more mobile stations at a selected mobile station, thereby to permit the user of the selected mobile station better to utilize the data. The location at which the mobile stations are positioned are displayed together with a static map at a selected mobile station. The user of the selected mobile station is able to ascertain the position of the mobile station relative to the static map. When the position of more than one mobile station is displayed together with the static map, the relative positions of the mobile stations, in terms of the static map, are ascertainable by the user of the selected mobile station.

BACKGROUND OF THE INVENTION

A communication system is formed, at a minimum, of a sending station and a receiving station between which information is communicated. A communication channel is formed between the sending station and the receiving station. The information to be communicated by the sending station to the receiving station is communicated thereon. A wide variety of different types of communication systems have been developed and are regularly utilized to effectuate communication of information between the sending and receiving stations.

New types of communication systems have been developed and implemented as a result of advancements in communication technologies. Radio communication systems are exemplary of communication systems which have benefited from advancements in communication technologies. Improvements to existing types of radio communication systems, and new types of radio communication systems, have been made possible as a result of the advancements in communication technologies.

In contrast to a wireline communication system, a radio communication system utilizes a radio link extending between the sending and receiving stations upon which to define a radio channel which forms the communication channel. The radio link upon which the radio channel is formed is defined, at least in part, by frequencies of the electromagnetic spectrum. Because a radio link is utilized to form the communication channel, the wireline connection, conventionally required in a wireline communication system, and otherwise needed to interconnect the sending and receiving stations, is obviated. Thereby, increased communication mobility is inherently permitted in a radio communication system, in contrast to a wireline communication system. Infrastructure costs which would otherwise be required to install a wireline communication system are generally significantly reduced in a radio communication system as radio links, rather than wirelines, are utilized to interconnect sending and receiving stations.

A cellular communication system is exemplary of a new type of radio communication which has been made possible as a result of advancements in communication technologies. A cellular communication system is a multi-user communication system which provides for radio communications with users of mobile stations when the mobile stations are operated within a geographical area encompassed by the network infrastructure of the communication system. Telephonic communication of voice, as well as non-voice, data is permitted in a cellular communication system through proper utilization of a mobile station.

A cellular communication system makes relatively efficient utilization of the portion of the electromagnetic spectrum allocated thereto and upon which the radio channels are defined. The relatively efficient utilization of the allocated electro magnetic spectrum is provided by the positioning of a plurality of spaced-apart, fixed-site transceivers which form portions of the network infrastructure of the communication system. Through the use of the plurality of fixed-site transceivers, a mobile station is likely to be positioned in proximity to at least one of the transceivers. Only relatively low-power signals are thereby required to be generated, and the same frequency channels can be reused at different locations throughout the geographical area encompassed by the cellular communication system according to a cell reuse scheme.

While the use of the cellular communication system through which to communicate has many advantages, the mobility inherent of a mobile station operable in a cellular communication system does not provide for simple tracking of the location of the mobile station. Tracking of the location at which a mobile station is positioned is important, for instance, when a request is made for emergency assistance.

When a call is originated at a conventional wireline device, the geographical position from which the call is originated is easily determinable. A simple mapping of the identity of the wireline device at which the call is originated together with the location at which the device is installed provides some indication of the location at which the call is originated. A similar mapping is not possible when a call is originated at a mobile station due to the inherent mobility of the mobile station. The geographical position at which a call is originated by a user of a mobile station is not easily determinable.

Proposals have been set forth to overcome this shortcoming of use of a radio communication system. One such proposal makes use of GPS (global positioning system) technologies. GPS receivers are available to receive and to detect TOA (time of arrival) signals generated by satellite-based transmitters. Incorporation of a GPS receiver into a mobile station permits the location in which the mobile station is positioned to be determined. The network infrastructure of the communication system is provided with the position information determined at the mobile station. That is to say, signals indicative of the determination can be communicated by the mobile station by way of a radio link, thereby to indicate the position in which the mobile station is located when a call is originated therefrom. Other proposals have been set forth to facilitate determination of the location at which a mobile station is positioned utilizing signals communicated between the network infrastructure of the communication system and the mobile station.

Generally, existing, and proposed, system requirements relating to identification of the location in which a mobile station is positioned are set forth to provide emergency center personnel with indications of the position information. Utilization of this information for other uses would permit additional features and services to be provided to users of a cellular communication system.

Additional manners by which to utilize positional information indicative of the location at which a mobile station operable in a radio communication system is positioned would be beneficial.

It is in light of this background information related to positional information related to the location at which a mobile station operable in a cellular, or other radio, communication system is positioned that the significant improvements of the present invention have evolved.

SUMMARY OF THE INVENTION

The present invention, accordingly, advantageously provides apparatus, and an associated method, by which to utilize positional data, generated during operation of a radio communication system, such as a cellular communication system of the location at which at least one mobile station operable in the communication system is positioned.

Through operation of an embodiment of the present invention, a manner is provided by which to display positional data related to one or more mobile stations at a selected mobile station. When displayed at the selected mobile station, the user of the mobile station is able to utilize the positional data.

In one aspect of the present invention, the location at which a mobile station is positioned is displayed together with a static map at a visual display device of a selected mobile station. By displaying the location at which the mobile station is positioned together with the static map, a user of the selected mobile station is provided with a visual indication of the location of the mobile station in terms of the static map.

In another aspect of the present invention, the mobile station, the position of which is displayed together with the static map, is that of the selected mobile station. That is to say, in one aspect of the present invention, the mobile station carried by a user displays, at a visual display device thereof, the position of the mobile station upon a static map. The user of the mobile station is able to view the position of the mobile station and, hence, also the user, in terms of the static map. Subsequent movement of the user of the mobile station can be decided upon, responsive to viewing the static map and the user's position indicated thereon.

In another aspect of the present invention, the location at which the one mobile station is positioned is provided to another, i.e., a second, mobile station. The location at which the first mobile station is positioned thereafter displayed at a visual display device of the second mobile station together with a static map. A user of the second mobile station is thereby able to view the display device, thereby to be provided with a visual indication of the location at which the first mobile station is positioned. The user of the second mobile station is able, responsive thereto, e.g., to provide directional instructions to the user of the first mobile station.

In another aspect of the present invention, indication of the locations at which a first and at least a second mobile station are positioned are provided to a selected mobile station. The selected mobile station to which the indications of the position of the first and second mobile station are provided is, for instance, one of the first and second mobile stations. The indications of the locations of the two, or more, mobile stations are displayed together with a static map at a visual display device of the selected mobile station. The static map includes a plot of the geographical area at which both of the at least two mobile stations are positioned. A user of the selected mobile station is thereby able to view the relative positions of the mobile station by viewing the visual display of the selected mobile stations at which the locations of the mobile two or more mobile stations are plotted together with the static map. When one of the mobile stations plotted together with the static map is the mobile station at which the static map is displayed, i.e., the selected mobile station, the user of the mobile station is able to view the relative position of another mobile station to the position of the user in terms of the static map. The user of the selected mobile station, responsive thereto, is able to provide relative directional instructions to the user of the other mobile station.

In one implementation, a manner is provided by which to display positional data related to a mobile station operable in a cellular communication system. The positional data of the mobile station is displayed together with a static map at a visual display device of a selected mobile station. Indications of the location at which the mobile station are positioned are provided to the mobile station at which the display is to be generated. A static map of a geographical area encompassing the location at which the mobile station is positioned is displayed at the visual display device together with the location at which the mobile station is positioned. A user of the mobile station is thereby provided with a visual indication of the mobile station in terms of the static map. The user of the mobile station is thereby better able to make use of the positional data regarding the mobile station.

In these and other aspects, therefore, apparatus, and an associated method, is provided in a radio communication system having at least a first mobile station operable by at least a first user to communicate therewith by way of a network infrastructure. Identification of the location of at least a selected one of the at least first mobile station to the first user of the mobile station is facilitated. A position indication detector is coupled at least to receive indications of the location of the at least selected one of the at least the first mobile station. The position indication detector detects the location of the at least the selected one of the at least the first mobile station. A map display generator is located at the first mobile station. The map display generator displays at the first mobile station a map display. The map display includes a mapped area including the location at which the at least the selected one of the at least the first mobile station is positioned. A position indicator is coupled to the position indication detector. The position indicator indicates on the map display generated by map display generator the location of the at least the selected one of the at least the first mobile station. Thereby, the location of the at least the selected one of the at least the first mobile station is identified to the first user of the first mobile station.

A more complete appreciation of the present invention and to the scope thereof can be obtained from the accompanying drawings which are briefly summarized below, the following detailed description of the presently-preferred embodiments of the invention, and the appended Claims.

DETAILED DESCRIPTION

Figure 1:
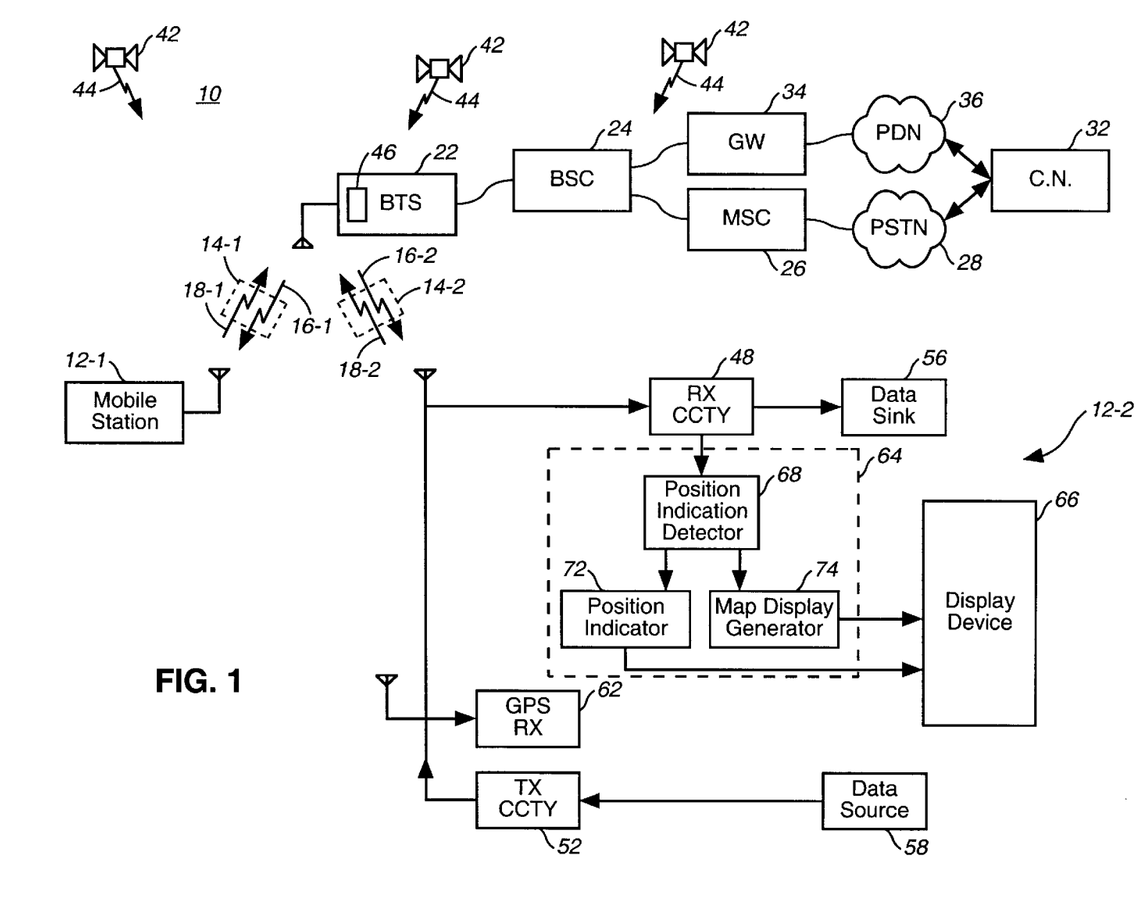
FIG. 1 illustrates a functional block diagram of a radio communication system in which an embodiment of the present invention is operable.

Referring first to FIG. 1, a communication system, shown generally at 10, provides for radio communications with mobile stations 12, of which two mobile stations, mobile station 12-1 and mobile station 12-2 are shown in the figure. In the exemplary implementation, the communication system 10 forms a cellular communication system in which positional information indicative of the locations at which the mobile stations are located are determined during operation of the communication system. While the following description of operation of an embodiment of the present invention shall be described with respect to the exemplary implementation in which the communication system 10 forms a cellular communication system, it should be understood that the present invention is analogously also operable in other types of radio communication systems in which positional information, related to the locations at which mobile stations operable therein are positioned, is generated during operation of such other communication systems.

In operation of the communication system, two-way communications are permitted between a mobile station and network infrastructure by way of radio channels defined upon radio links 14 formed between the mobile stations and the network infrastructure. In the Figure, the radio link 14-1 represents a radio link formed between the mobile station 12-1 and network infrastructure. And, the radio link 14-2 represents a radio link formed between the mobile station 12-2 and the network infrastructure.

Forward link signals generated, or otherwise supplied, to the network infrastructure of the communication system are transmitted upon forward links 16 for communication to the mobile stations. And, reverse link signals generated at the mobile stations are communicated upon reverse links 18 to the network infrastructure. The radio link 14-1 is here indicated to include forward and reverse links 16-1 and 18-1. Analogously, the radio link 14-2 is shown to include a forward link 16-2 and a reverse link 18-2.

The network infrastructure of the communication systems forms a radio access network (RAN) part of the communication system. Here, the network infrastructure is shown to include a base transceiver station (BTS) 22 which is operable to transceive communication signals with the mobile stations 12 positioned in proximity to the base transceiver station. In conventional manner, a base transceiver station defines a cell formed of a portion of the geographical area encompassed by the cellular communication system. While only a single base transceiver station is shown in the figure, in a typical cellular communication system, a large number of base transceiver stations are positioned at spaced-apart locations throughout a geographical area which is to be encompassed by the communication system. Each of the base transceiver stations defines a cell, and the cells collectively define the geographical area encompassed by the communication system.

The base transceiver station is coupled to the base station controller (BSC) 24. The base station controller is operable, amongst other things, to control operation of the base transceiver station 22. In a typical implementation, several base transceiver stations are coupled to a single base station controller.

The base station controller is coupled to a mobile switching center (MSC) 26. The mobile switching center, in turn, is coupled to a telephonic network, here a public-switched, telephonic network (PSTN) 28. Other communication stations are also coupled to the telephonic network. Here, a correspondent node 32 is shown to be coupled to the telephonic network. The communication system is here shown also to provide for packet communications. The base station controller 24 is also coupled to a packet-network gateway 34 which, in turn, is coupled to a packet data network (PDN) 36, such as the internet backbone. The correspondent node 32 is here shown to be coupled to the packet data network.

Communication paths formable between the correspondent node 32 and a selected mobile station 12 permit communications to be effectuated therebetween. Packet-based communications are effectuated by way of a communication path which includes the packet data network 36, the gateway 34, the base station controller 24, the base transceiver station 22, appropriate radio links 14 and the mobile station. And, circuit-switched communications are effectuated between the correspondent node and the mobile station by way of the communication path, including the telephonic network 28, the mobile switching center 26, the base station controller 24, and the base transceiver station 22.

The communication system 10 also provides for the determination of the locations at which the mobile stations 12 operable therein are positioned. Alternate, or complementary, manners by which to determine the positional information associated with the mobile stations are shown in the figure.

Satellite-based stations 42 of a global positioning system (GPS) generate positioning signals 44 which, when received at appropriate circuitry of the mobile stations, permit calculation of the positional information.

Alternately, or complementary to use of the positioning signals 44 to determine the positioning information associated with the mobile stations, is position indication circuitry 46, of the network infrastructure of the communication system. Here, the position indication circuitry is shown to be located at the base transceiver station 22 of the network infrastructure. The position indication circuitry is functionally represented, and can be located elsewhere in the communication system. The position indication circuitry is operable to determine the locations at which the mobile stations 12 are positioned by generating and detecting signals communicated with the mobile station. Overhead signaling, that is, control channel signaling is used, for instance, in the determinations made by the position indication circuitry.

The mobile station 12-2 is shown to include both receive circuitry 48 and transmit circuitry 52 coupled to an antenna transducer 54. Other mobile stations, such as the mobile station 12-1, are analogously constructed.

The receive circuitry is operable to act upon forward link signals detected by, and converted into electrical form by the antenna transducer. The receive circuitry is coupled to a data sink 56 to which signals, operated upon by the receive circuitry 48 are applied subsequent to operations performed thereon by the receive circuitry.

A data source 58 is coupled to the transmit circuitry 52. The data source sources data which is operated upon by the transmit circuitry, thereafter to be applied to the antenna transducer 54 to be transduced therefrom. Data sourced at the data source 58 forms the informational content of the signals transmitted upon the reverse link 18 of a radio link 14 formed between the mobile station and the network infrastructure.

A GPS receiver 62 is also shown to form a portion of the mobile station. The GPS receiver is operable to receive and to operate upon the positioning signals 44 generated by the satellite-based stations 42 of the global positioning system. Through appropriate operations performed upon the positioning signals detected at the mobile station by the GPS receiver circuitry, the location at which the mobile station is positioned is determinable.

The mobile station also includes control circuitry 64. The control circuitry includes functional elements operable pursuant to an embodiment of the present invention. In the exemplary implementation, the control circuitry includes processing circuitry, and the functional elements shown to form portions of the control circuitry comprise algorithms executable by the processing circuitry. In other implementations, the operations represented by the functional elements are implemented in other manners.

The mobile station is further shown to include a display device 66. The display device is formed, for instance, of a light emitting diode display which forms a user display upon which data generated during operation of an embodiment of the present invention is displayed.

An embodiment of the present invention displays a mapped area together with indications of locations at which one or more mobile stations are positioned. A user of the mobile station at which the mapped area and positional information is displayed is able to make use of the information.

When the positional information displayed at the display device together with the map area pertains to the mobile station used by the user, the user is provided with a graphical representation of the location of the user who carries or operates the mobile station.

When the positional information displayed at the display device together with the mapped area is that of another mobile station, the user of the mobile at which the positional information is displayed is provided with a graphical representation of the location at which the other mobile station is positioned. Directions, or other instructions, can thereafter be given to the user of the other mobile station with knowledge of the location of the other mobile station.

The control circuitry includes a position indication detector 68. The detector is coupled to the receive circuitry 48 of the receive portion of the mobile station. Positional information related to one or more mobile stations transmitted to the mobile station upon a forward link is detected by the position indication detector 68. The detector thereby detects the location at which a mobile station, is positioned. If information related to the locations at which two or more mobile stations are positioned is communicated to the mobile station, the detector analogously detects the location of the two or more mobile stations.

The detector 68 is coupled to a position indicator 72 and to a map display generator 74. The map display generator is operable to generate a map display including a mapped area encompassing the location at which the position, or positions, of the mobile station, or the mobile stations detected by the position indication detector is or are positioned. The mapped area forming the map display generated by the generator 74 is provided to the display device 66 to display the mapped area thereat.

The position indicator 72 is operable responsive to the detections made by the detector 68. The position indicator is operable to indicate on the map display formed of the mapped area generated by the map display generator, the position of the mobile station, the positional information of which is detected by the detector. While the position indicator 72 is shown to be coupled to display device 66, such connections functional, and, instead, the indications formed by the position indicator can be applied to the map display generator to be incorporated into the map display generated by the map display generator. By overlaying, or otherwise indicating the position of the mobile station upon the mapped area, a user of a mobile station viewing the display device is able to locate the mobile station indicated thereon in terms of the mapped area.

In exemplary operation of an embodiment of the present invention, mobile stations containing GPS receiver circuitry provide determinations of the locations of the respective mobile stations to the transmit portions of the respective mobile stations. The positional information representative of the determinations made by the GPS receiver circuitry is to transmitted upon reverse links to the network infrastructure of the communication system. Structure at the network infrastructure, such as the position indication circuitry 46, is selectably operable to send indications of the positions of selected ones of the mobile stations upon forward links to selected ones of the mobile stations. When such information is received at a mobile station, the information is utilized to generate a mapped display upon which the position of a mobile station is indicated.

Figure 2:
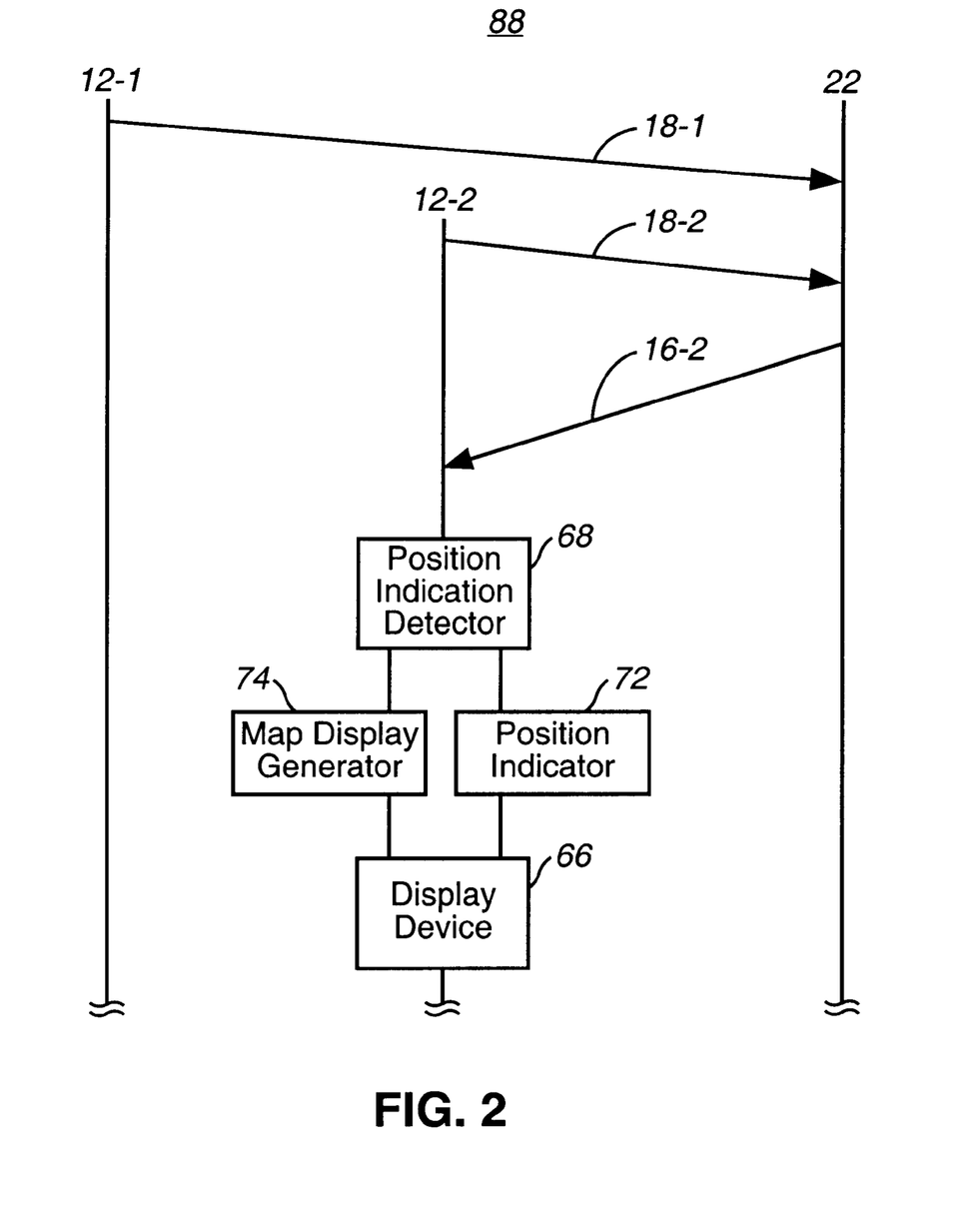
FIG. 2 illustrates a message sequence diagram representative of signals generated during operation of an embodiment of the present invention.

FIG. 2 illustrates a message sequence diagram, shown generally at 88, representative of operation of an embodiment of the present invention. The message sequence diagram is representative of operation of a system in which mobile stations include GPS receiver circuitry capable of determining the locations of the mobile stations at which the GPS receiver circuitry is positioned. Here, the display device of the mobile station 12-2 displays the indications of the locations at which two mobile stations, the mobile stations 12-1 and 12-2, are positioned in terms of a mapped area encompassing both of such positions.

Position information related to the mobile station 12-1, determined by the GPS receiver circuitry thereof, is sent upon a reverse link 18-1 to the base transceiver station 22. Similarly, positional information associated with the mobile station 12-2, determined at the mobile station 12-2 is transmitted upon a reverse link 18-2 to the base transceiver station. Structure at the base transceiver station, in turn, generates a forward link signal for communication upon the forward link 16-2 to the mobile station 12-2. The signal generated by the base transceiver station identifies the locations at which the mobile stations 12-1 and 12-2 are positioned. The information is detected at the position indication detector 68 of the mobile station 12-2. Indications of the detection are provided to the mapped display generator 74 and to the position indicator 72. A mapped display formed of a mapped area and the indication of the positions of the mobile stations 12-1 and 12-2 overlayed thereon is generated and displayed upon the display device 66. Thereby, a user of the mobile station 12-2 is able to view the location of which the mobile stations 12-1 and 12-2 are positioned in terms of a map. The user of the station 12-2 is able, for instance, in response thereto to provide directional instructions to a user of the mobile station 12-1, such as through operation of the mobile stations to communicate telephonically therethrough.

Figure 3:
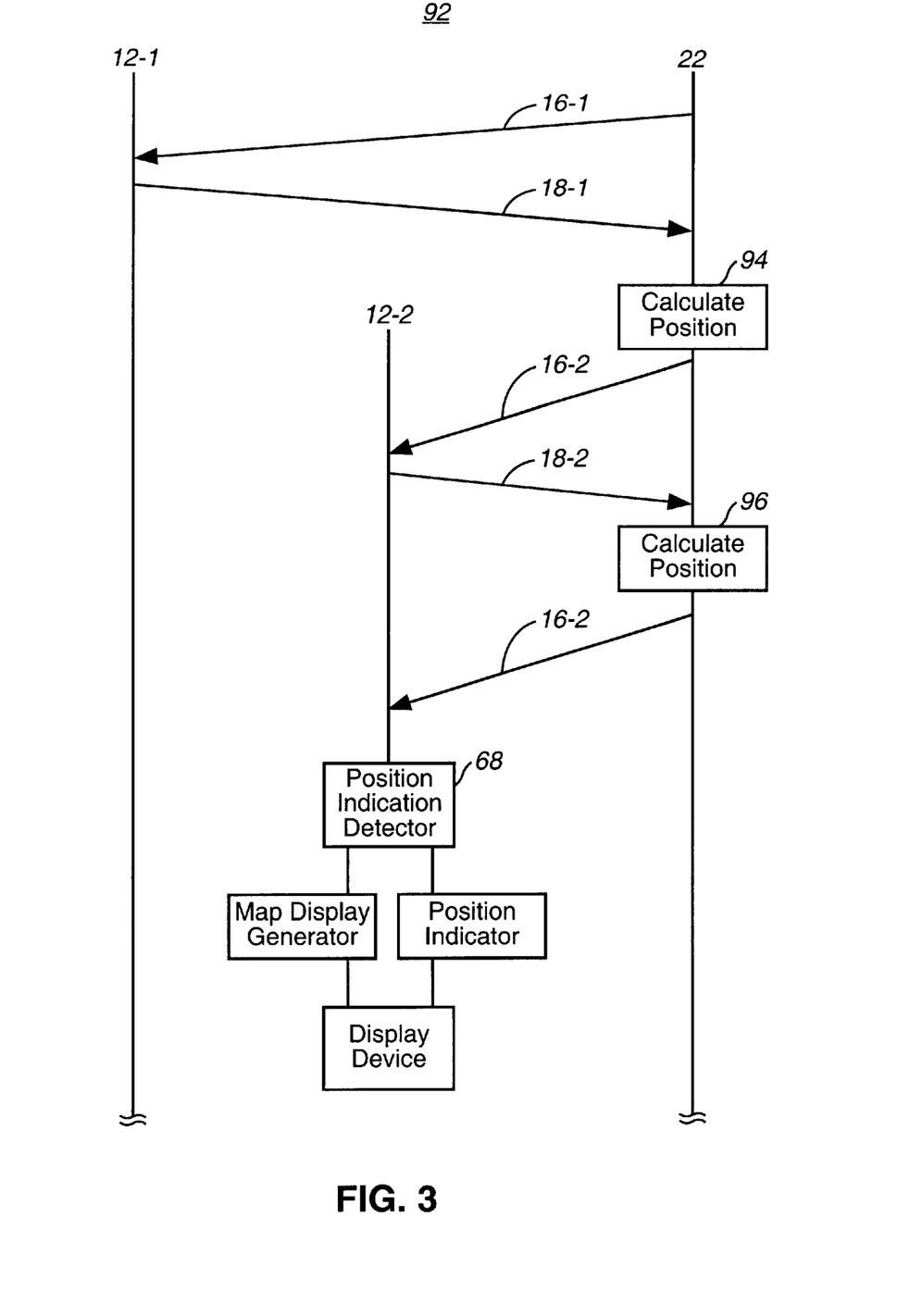
FIG. 3 illustrates another message sequence diagram, similar to that shown in FIG. 2, but here illustrating signals generated during operation of another embodiment of the present invention.

FIG. 3 illustrates a message sequence diagram 92 representative of operation of another embodiment of the present invention. Here, determination of the location at which the mobile stations 12-1 and 12-2 are positioned are determined at the network infrastructure of the communication system. Here, signaling effectuated between the base transceiver station and the mobile station 12-1, indicated on the forward and reverse link channels 16-1 and 18-1, permits the location in which the mobile station 12-1 is positioned to be calculated at base transceiver station. Such calculation is indicated by the block 94. Similarly, signaling between the base transceiver station and the mobile station 12-2, indicated on the forward and reverse links 16-2 and 18-2, permit the determination of the position at which the mobile station 12-2 is located to be determined at the base transceiver station, indicated by the block 96.

A signal generated by the base transceiver station and transmitted to the mobile station 12-2 on the forward link 16-2 provides positional information to the mobile station 12-2 of the location at which the mobile stations 12-1 and 12-2 are positioned. Again, such information is detected by the detector 68, and indications of the detections are provided to the position indicator 72 and the map display generator 74. The indicator and generator are operable as noted previously, to cause the generator of a mapped display upon the display device 66.

In manners analogous to those described with respect to the message sequence diagram 88 and 82, the location at which a single mobile station is positioned, or other combinations of mobile stations are positioned, is also displayable upon the display device of any selected mobile station. Thereby, a user of any selected mobile station is provided with a display of the location at which a mobile station is positioned in terms of a mapped area.

Figure 4:
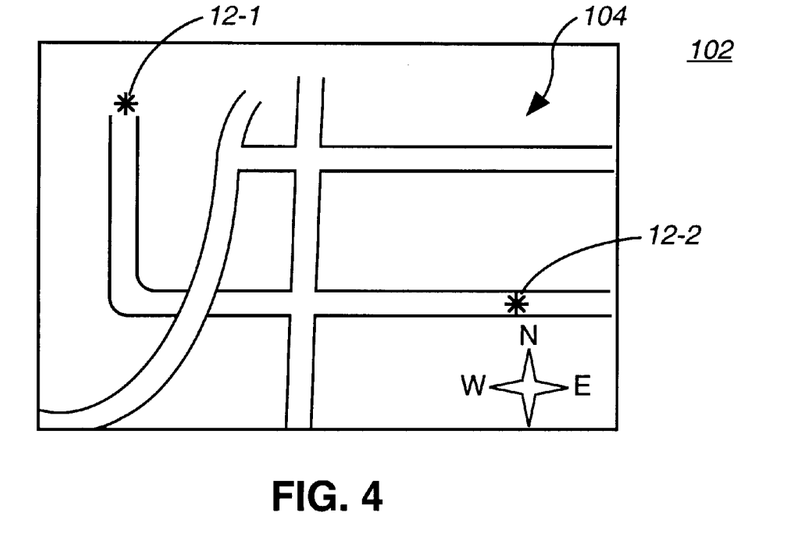
FIG. 4 illustrates an exemplary display generated during operation of an embodiment of the present invention.

FIG. 4 illustrates an exemplary display, show generally at 102, generated upon a display device pursuant to operation of an embodiment of the present invention. Here, the locations at which the mobile stations 12-1 and 12-2 are positioned are overlaid, or otherwise plotted, upon a mapped area 104. Thereby, a user of a mobile station at which the display 102 is displayed is able to view the location at which the mobile stations are positioned in terms of the mapped area.

Figure 5:
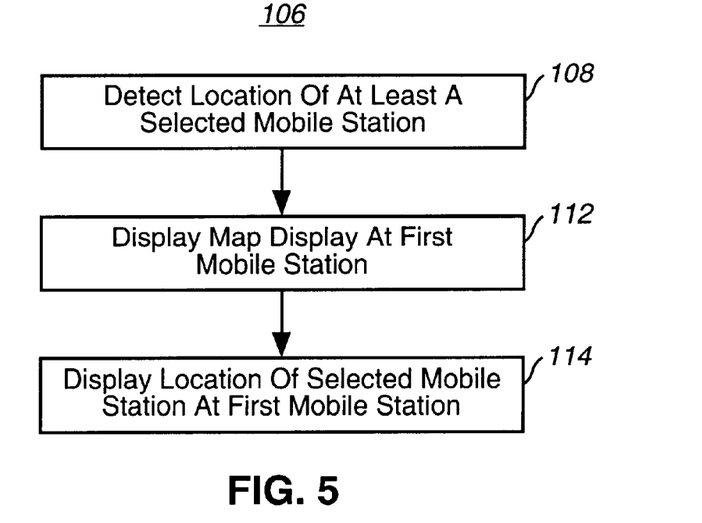
FIG. 5 illustrates a method flow diagram listing the method of operation of an embodiment of the present invention.

FIG. 5 illustrates a method, shown generally at 106 of an embodiment of the present invention. The method facilitates identification of at least a selected mobile station to a user of the mobile station. First, and as indicated by block 108, the location of at least a selected one of at least a first mobile station is detected.

Then, and as indicated by the block 112, a map display is displayed at the first mobile station. The map display includes a mapped area including the location at which the at least selected mobile station is positioned. Then, and as indicated by the block 114, the location of the at least selected mobile station is also indicated on the map display. Thereby, the location of the at least the selected mobile station is identified to the user of the mobile station at which the map display is displayed.

Thereby, a manner is provided by which to utilize positional data generated during operation of the cellular communication system, or other radio communication system, of the location at which at least one mobile station is positioned.

The previous descriptions are of preferred examples for implementing the invention, and the scope of the invention should not necessarily be limited by this description. The scope of the present invention is defined by the following claims.

We claim:

1. In a radio communication system having at least a first mobile station operable by a first user to communicate therewith by way of network infrastructure and at least a second mobile station operable by a second user to communicate therewith by way of the network infrastructure, an improvement of apparatus for facilitating identification of location at the first mobile station of at least the second mobile station to the first user of the first mobile station, said apparatus comprising:

a position indication detector located at the first mobile station, said position indication detector coupled at least to receive indications of the location of both of the first mobile station and the second mobile station, said position indication detector for detecting the locations of both of the first mobile station and the second mobile station;

a map display generator located at the first mobile station, said map display generator for generating and displaying at the first mobile station a map display, the map display including a mapped area including the location at which both of the first mobile station and the second mobile station are positioned; and a position indicator coupled to said position indication detector, said position indicator for indicating on the map display generated by said map display generator the location of the at least the second mobile station, thereby simultaneously to identify to the first user of the first mobile station the location of both of the first mobile station and the second mobile station upon the mapped area of the map display formed by said map display generator.

2. The apparatus of claim 1 wherein the indications of the location of the at least the second mobile station are transmitted to the first mobile station by the network infrastructure of the radio communication system.

3. The apparatus of claim 2 wherein overhead signaling is communicated between the network infrastructure and the first mobile station and wherein the location of the at least the second mobile station is determined at the network infrastructure.

4. The apparatus of claim 1 wherein the at least the second mobile station further comprises GPS (global positioning system) receiver circuitry operable to receive GPS signals and wherein the location of the at least the second mobile station is determined at the GPS receiver circuitry.

5. The apparatus of claim 4 wherein indications of determinations made at the second mobile station of the location of the at least the second mobile station are communicated to the network infrastructure and wherein the indications of the location of the at least the second mobile station are transmitted to the first mobile station by the network infrastructure and are of values responsive to determinations made at the GPS receiver circuitry and communicated to the network infrastructure.

6. The apparatus of claim 1 further comprising a visual display device coupled to said map display generator, said visual display device for displaying the map display generated by said map display generator.

7. The apparatus of claim 6 wherein the location of the at least the second mobile station indicated on the map display by said position indicator is displayed upon said visual display device.

8. In a method for communicating in a radio communication system having a first mobile station operable by a first user to communicate therewith by way of network infrastructure and at least a second mobile station operable by a second user to communicate therewith by way of the network infrastructure, an improvement of a method for facilitating identification of location at the first mobile station of at least the second mobile station to the user of the first mobile station, said method comprising:

detecting, at the first mobile station, the locations of both of the first mobile station and the second mobile station;

displaying at the first mobile station a locally-generated map display, the map display including a mapped area including the locations detected during said operation of detecting, at which the first mobile station and the second mobile station are positioned; and indicating on the map display displayed during said operation of displaying the locations of both of the first mobile station and the second mobile station, thereby to identify to the first user the location of the first mobile station and the second mobile station.

9. The method of claim 8 further comprising the operation, prior to said operation of detecting, of sending indications of the location of the at least the second mobile station to the first mobile station via the network infrastructure.

10. The method of claim 9 comprising the additional operation, prior to said operation of sending, of determining, at the network infrastructure, the location of the at least the second mobile station.

* * * * *